(12) United States Patent
Furey et al.

(10) Patent No.: US 11,656,775 B2
(45) Date of Patent: May 23, 2023

(54) VIRTUALIZING ISOLATION AREAS OF SOLID-STATE STORAGE MEDIA

(71) Applicant: Marvell World Trade Ltd., St. Michael (BB)

(72) Inventors: Scott Furey, Cupertino, CA (US); Liping Guo, Palo Alto, CA (US); Salil Suri, Fremont, CA (US); Yingdong Li, Palo Alto, CA (US)

(73) Assignee: Marvell ASIA PTE, LTD., Singapore (SG)

( * ) Notice: Subject to any disclaimer, the term of this patent is extended or adjusted under 35 U.S.C. 154(b) by 793 days.

(21) Appl. No.: 16/533,243

(22) Filed: Aug. 6, 2019

(65) Prior Publication Data

US 2020/0050385 A1     Feb. 13, 2020

Related U.S. Application Data

(60) Provisional application No. 62/715,718, filed on Aug. 7, 2018.

(51) Int. Cl.
    *G06F 9/46*         (2006.01)
    *G06F 3/06*         (2006.01)

(52) U.S. Cl.
    CPC .......... *G06F 3/0635* (2013.01); *G06F 3/0614* (2013.01); *G06F 3/0653* (2013.01);
(Continued)

(58) Field of Classification Search
    CPC .... G06F 3/0635; G06F 3/0614; G06F 3/0653; G06F 3/0659; G06F 3/0662;
(Continued)

(56) References Cited

U.S. PATENT DOCUMENTS 6,671,791 B1    12/2003    McGrath
8,504,780 B2    8/2013    Mine et al.
(Continued)

FOREIGN PATENT DOCUMENTS

CN      1708742      12/2005
CN    106487719      3/2017
(Continued)

OTHER PUBLICATIONS

"International Preliminary Report on Patentability", Application No. PCT/IB2019/059194, dated Apr. 27, 2021, 9 pages.
(Continued)

*Primary Examiner* — Thuy N Pardo

(57) ABSTRACT

The present disclosure describes apparatuses and methods for virtualizing isolation areas of solid-state storage media. In some aspects, a storage media accelerator determines, via a storage media interface, a geometry of solid-state storage media. The accelerator selects, based on the geometry, an area of the solid-state storage media as an isolated unit of storage. A physical address of the isolated unit of storage is then mapped to a virtual address. The accelerator exposes, via the virtual address, the isolated unit of storage through a host interface to enable host access of the isolated unit of storage. The accelerator may also remap the isolated unit of storage to other areas of the solid-state storage media without host interaction. By so doing, the accelerator may provide virtualized isolation and partitioning functionalities to a host, while efficiently handling lower-level storage media functions, such as wear leveling and load balancing, without host involvement.

20 Claims, 12 Drawing Sheets

(52) U.S. Cl.
CPC .......... *G06F 3/0659* (2013.01); *G06F 3/0662* (2013.01); *G06F 3/0683* (2013.01); *G06F 2206/1012* (2013.01); *G06F 2212/7211* (2013.01)

(58) Field of Classification Search
CPC .......... G06F 3/0683; G06F 2206/1012; G06F 2212/7211; G06F 2212/1016; G06F 2212/1036; G06F 2212/152; G06F 2212/154; G06F 2212/7201; G06F 2212/7208; G06F 3/061; G06F 3/0616; G06F 3/0652; G06F 3/067; G06F 3/0688; G06F 12/024
USPC ............................................ 718/1, 105, 104
See application file for complete search history.

(56) References Cited

U.S. PATENT DOCUMENTS

| | | | |
|---|---|---|---|
| 8,751,713 | B2 | 6/2014 | Ayzenfeld et al. |
| 9,015,351 | B1 | 4/2015 | Geddes et al. |
| 9,378,049 | B1 | 6/2016 | Johnson |
| 9,734,096 | B2 | 8/2017 | Lee et al. |
| 9,747,039 | B1 | 8/2017 | Coleman et al. |
| 10,228,874 | B2 | 3/2019 | Wysocki et al. |
| 10,318,324 | B2 | 6/2019 | Carson et al. |
| 10,860,213 | B2 | 12/2020 | Singh et al. |
| 10,901,910 | B2 | 1/2021 | Raisch et al. |
| 10,956,346 | B1 * | 3/2021 | Ben-Yehuda ....... G06F 13/4027 |
| 10,963,393 | B1 * | 3/2021 | Ben-Yehuda ......... G06F 3/0679 |
| 11,010,314 | B2 | 5/2021 | Therene et al. |
| 11,055,232 | B2 | 7/2021 | Keppel et al. |
| 11,074,013 | B2 | 7/2021 | Salil et al. |
| 11,256,431 | B1 * | 2/2022 | Ben-Yehuda ......... G06F 3/0608 |
| 11,372,580 | B2 | 6/2022 | Guo et al. |
| 11,372,586 | B2 | 6/2022 | L'Ecuyer et al. |
| 11,467,991 | B2 | 10/2022 | Therene et al. |
| 11,481,118 | B2 | 10/2022 | Klein et al. |
| 2005/0182948 | A1 | 8/2005 | Ducharme |
| 2007/0260825 | A1 | 11/2007 | Yudenfriend et al. |
| 2008/0100636 | A1 | 5/2008 | Lai et al. |
| 2008/0177974 | A1 | 7/2008 | Chiang et al. |
| 2008/0182948 | A1 | 7/2008 | Xiaoming et al. |
| 2009/0077333 | A1 | 3/2009 | Byrne et al. |
| 2010/0169382 | A1 | 7/2010 | Sheaffer et al. |
| 2011/0154318 | A1 | 6/2011 | Oshins et al. |
| 2012/0010772 | A1 | 1/2012 | Pack et al. |
| 2012/0151178 | A1 | 6/2012 | Brownlow et al. |
| 2012/0183001 | A1 | 7/2012 | Suzuki et al. |
| 2012/0192178 | A1 | 7/2012 | Brownlow et al. |
| 2012/0254464 | A1 | 10/2012 | Armstrong et al. |
| 2013/0145231 | A1 | 6/2013 | Frayer et al. |
| 2013/0179877 | A1 | 7/2013 | Dain |
| 2013/0254146 | A1 | 9/2013 | Ellis et al. |
| 2014/0089233 | A1 | 3/2014 | Ellis et al. |
| 2014/0096132 | A1 * | 4/2014 | Wang .................... G06F 9/4552 718/1 |
| 2014/0143558 | A1 | 5/2014 | Kuesel |
| 2014/0281106 | A1 | 9/2014 | Saghi et al. |
| 2015/0317088 | A1 | 11/2015 | Hussain et al. |
| 2015/0378884 | A1 | 12/2015 | Nemazie et al. |
| 2016/0224248 | A1 | 8/2016 | Choi et al. |
| 2016/0267016 | A1 | 9/2016 | Lee et al. |
| 2016/0292007 | A1 | 10/2016 | Ding et al. |
| 2016/0371014 | A1 | 12/2016 | Roberts |
| 2017/0024132 | A1 | 1/2017 | Jun et al. |
| 2017/0031816 | A1 | 2/2017 | Lee et al. |
| 2017/0032245 | A1 | 2/2017 | Osband et al. |
| 2017/0070241 | A1 | 3/2017 | Kaku et al. |
| 2017/0123901 | A1 | 5/2017 | Zhao et al. |
| 2017/0124463 | A1 | 5/2017 | Chen et al. |
| 2017/0149733 | A1 | 5/2017 | Chastain et al. |
| 2017/0220410 | A1 | 8/2017 | Kim et al. |
| 2017/0235510 | A1 | 8/2017 | Hu et al. |
| 2017/0269876 | A1 | 9/2017 | Mukhopadhyay et al. |
| 2017/0277573 | A1 | 9/2017 | Huynh |
| 2018/0032249 | A1 | 2/2018 | Makhervaks et al. |
| 2018/0088804 | A1 * | 3/2018 | Mummidi ............... G06F 3/061 |
| 2018/0181302 | A1 | 6/2018 | Liu |
| 2018/0210754 | A1 | 7/2018 | Vaish et al. |
| 2018/0217951 | A1 | 8/2018 | Benisty et al. |
| 2018/0307622 | A1 | 10/2018 | Smith et al. |
| 2018/0373450 | A1 | 12/2018 | Ji et al. |
| 2019/0042799 | A1 | 2/2019 | Durham et al. |
| 2019/0050295 | A1 | 2/2019 | Ding et al. |
| 2019/0129656 | A1 | 5/2019 | Bains et al. |
| 2019/0146823 | A1 * | 5/2019 | Rewaskar ............. G06F 9/4406 718/1 |
| 2019/0266117 | A1 | 8/2019 | Duncan et al. |
| 2019/0278620 | A1 * | 9/2019 | Korbar ................ G06F 9/45558 |
| 2019/0354599 | A1 | 11/2019 | Mital et al. |
| 2020/0004701 | A1 | 1/2020 | Subbarao et al. |
| 2020/0042341 | A1 | 2/2020 | Gupta et al. |
| 2020/0050403 | A1 | 2/2020 | Suri et al. |
| 2020/0050470 | A1 | 2/2020 | Guo et al. |
| 2020/0104056 | A1 | 4/2020 | Benisty et al. |
| 2020/0133898 | A1 | 4/2020 | Therene et al. |
| 2020/0225851 | A1 | 7/2020 | Klein et al. |
| 2020/0278799 | A1 | 9/2020 | Kumar et al. |
| 2020/0286562 | A1 | 9/2020 | Gorobets et al. |
| 2020/0310997 | A1 | 10/2020 | Chen et al. |
| 2020/0371954 | A1 | 11/2020 | Li et al. |
| 2021/0271611 | A1 | 9/2021 | Therene et al. |
| 2022/0334770 | A1 | 10/2022 | Guo et al. |
| 2023/0019264 | A1 | 1/2023 | Therene et al. |
| 2023/0045617 | A1 | 2/2023 | Narasimma Moorthy et al. |

FOREIGN PATENT DOCUMENTS

| | | |
|---|---|---|
| JP | 2009251751 | 10/2009 |
| TW | 201640358 | 11/2016 |
| WO | 2020089759 | 5/2020 |

OTHER PUBLICATIONS

"Extended European Search Report", European Application No. 19190611.4, dated Jan. 8, 2020, 12 pages.
Wang, et al., "SWANS: An Interdisk Wear-Leveling Strategy for RAID-0 Structured SSD Arrays", ACM Transactions an Storage, vol. 12, No. 3, Article 10, Apr. 2016, 22 pages.
"Foreign Office Action", EP Application No. 19190610.6, dated Sep. 7, 2021, 8 pages.
"Non-Final Office Action", U.S. Appl. No. 16/533,376, dated Oct. 4, 2021, 29 pages.
Dunlap, "The Intel Sysret Privilege Escalation", XenProject, Jun. 13, 2012, 7 pages.
"EP Search Report", EP Application No. 19190610.6, dated Dec. 20, 2019, 11 pages.
"Extended European Search Report", European Application No. 20151268.8, dated May 18, 2020, 7 pages.
"International Search Report and Written Opinion", PCT Application No. PCT/IB2019/059194, dated Jan. 22, 2020, 14 pages.
"Foreign Office Action", European Application No. 19190606.4, dated Jan. 28, 2021, 6 pages.
"Notice of Allowance", U.S. Appl. No. 16/664,528, dated Jan. 6, 2021, 9 pages.
"Notice of Allowance", U.S. Appl. No. 16/533,399, dated Mar. 23, 2021, 8 pages.
"Foreign Office Action", EP Application No. 19190611.4, dated Dec. 10, 2021, 8 pages.
"Notice of Allowance", U.S. Appl. No. 16/533,376, dated Feb. 24, 2022, 9 pages.
"Non-Final Office Action", U.S. Appl. No. 16/664,528, dated Sep. 18, 2020, 11 Pages.
"Non-Final Office Action", U.S. Appl. No. 16/533,399, dated Dec. 10, 2020, 20 pages.
"Foreign Office Action", EP Application No. 19190606.4, dated Apr. 21, 2022, 8 pages.

(56) References Cited

OTHER PUBLICATIONS

"Foreign Office Action", CN Application No. 201910727158.1, dated Jul. 22, 2022, 14 pages.
"Foreign Office Action", EP Application No. 19797810.9, dated Aug. 18, 2022, 10 pages.
"Non-Final Office Action", U.S. Appl. No. 16/737,137, dated Apr. 25, 2022, 10 pages.
"Notice of Allowance", U.S. Appl. No. 17/320,096, dated May 17, 2022, 12 pages.
"Notice of Allowance", U.S. Appl. No. 16/737,137, dated Jul. 28, 2022, 8 pages.
"Notice of Allowance", U.S. Appl. No. 17/809,115, dated Feb. 23, 2023, 19 pages.
Guan, et al., "SR-IOV Based Network Interupt-Free Virtualization with Event Based Polling", Dec. 2013, pp. 2596-2609.
"Foreign Office Action", CN Application No. 201910727158.1, dated Mar. 21, 2023, 15 pages.
"Notice of Allowance", U.S. Appl. No. 17/935,364, dated Mar. 29, 2023, 10 pages.

\* cited by examiner

VIRTUALIZING ISOLATION AREAS OF SOLID-STATE STORAGE MEDIA

CROSS REFERENCE TO RELATED APPLICATION

This present disclosure claims priority to U.S. Provisional Patent Application Ser. No. 62/715,718 filed Aug. 7, 2018, the disclosure of which is incorporated by reference herein in its entirety.

BACKGROUND

Many computing and electronic devices include non-volatile memory for storing software, applications, or data of the device. Additionally, most users stream data or access services with their devices, such as multimedia content or social media applications, over data networks from various locations or on the move. With the users' ever-increasing demand for data and services, storage and service providers have scaled up respective capacities of both device and networked storage to support access of all the data generated by the users. Typically, this large-scale data storage is implemented with arrays hard-disk drives, which scale to provide a large amount of data storage at a relatively low cost. As solid-state memory becomes more affordable, some storage providers have also attempted to use solid-state memory devices at larger scale for bulk data storage.

The construction and physical properties of solid-state memory devices, however, are very different from those of hard-disk drives. For example, solid-state memory devices are not organized based on the layout of a physical track or sectors which are laid out around a magnetic media disk of a hard-disk drive. As such, the legacy storage interfaces of most devices, which are designed to access data from the track and sector formats of a hard-disk drive, may have performance issues when accessing data stored in other types of memory. In the case of solid-state memory, attempting to access data through the legacy storage interface typically results in high read latency or damaging wear patterns when combined with the inherent write/erase cycles of solid-state memory operation.

SUMMARY

This summary is provided to introduce subject matter that is further described in the Detailed Description and Drawings. Accordingly, this Summary should not be considered to describe essential features nor used to limit the scope of the claimed subject matter.

In some aspects, a storage media accelerator implements a method that determines, via a storage media interface, a geometry of solid-state storage media that is coupled to the storage media interface. Based on the geometry of the solid-state storage media, an area of the solid-state storage media is selected as an isolated unit of storage. The accelerator maps a physical address of the isolated unit of storage to a virtual address through which the isolated unit of storage is accessible. The method then exposes, via the virtual address, the isolated unit of storage through a host interface to enable host access of the isolated unit of storage in the solid-state storage media. The method may also remap the isolated unit of storage to other areas of the solid-state storage media without host interaction (e.g., notification, interruption, or use of host compute resources). By so doing, the method implemented by the accelerator may provide isolation and partitioning functionalities to tenants (e.g., workloads or initiators) of the host, while efficiently handling lower-level storage media functions, such as wear leveling and load balancing, without host involvement or use of host computing resources.

In other aspects, an apparatus comprises a hardware-based processor, a memory configured to maintain processor-executable instructions to implement an application on the apparatus, and a host interface configured to enable the application to access data in storage media that is associated with the apparatus. The apparatus also includes a storage media accelerator that is coupled to the host interface and provides a storage media interface. The storage media accelerator is configured to determine, through the storage media interface, a geometry of solid-state storage media that is operably coupled with the apparatus. The storage media accelerator selects, based on the geometry of the solid-state storage media, an area of the solid-state storage media as an isolated unit of storage. A physical address of the isolated unit of storage is mapped to a virtual address through which the isolated unit of storage is accessible by the host. The storage media accelerator then exposes, via the virtual address, the isolated unit of storage through the host interface to enable access of the isolated unit of storage by the application.

In yet other aspects, a System-on-Chip (SoC) is described that includes a storage media interface, a host interface through which access to storage media is provided to a host, a hardware-based processor, and a memory configured to store processor-executable instructions for a storage media accelerator and an address map of the storage media accelerator. The storage media accelerator may be implemented to determine a geometry of solid-state storage media that is operably coupled with the storage media interface. The geometry is exposed by the solid-state storage media or a controller (e.g., an open-channel storage controller) through the storage media interface to the storage media accelerator. Based on the geometry of the solid-state storage media, the accelerator selects an area of the solid-state storage media (e.g., a NAND channel or NAND device) as an isolated unit of storage. In the address map, a physical address of the isolated unit of storage is associated with a virtual address through which the isolated unit of storage is accessible. The storage media accelerator then exposes, via the virtual address, the isolated unit of storage through the host interface to enable access of the isolated unit of storage by the host.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of virtualizing isolation areas of solid-state storage media are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
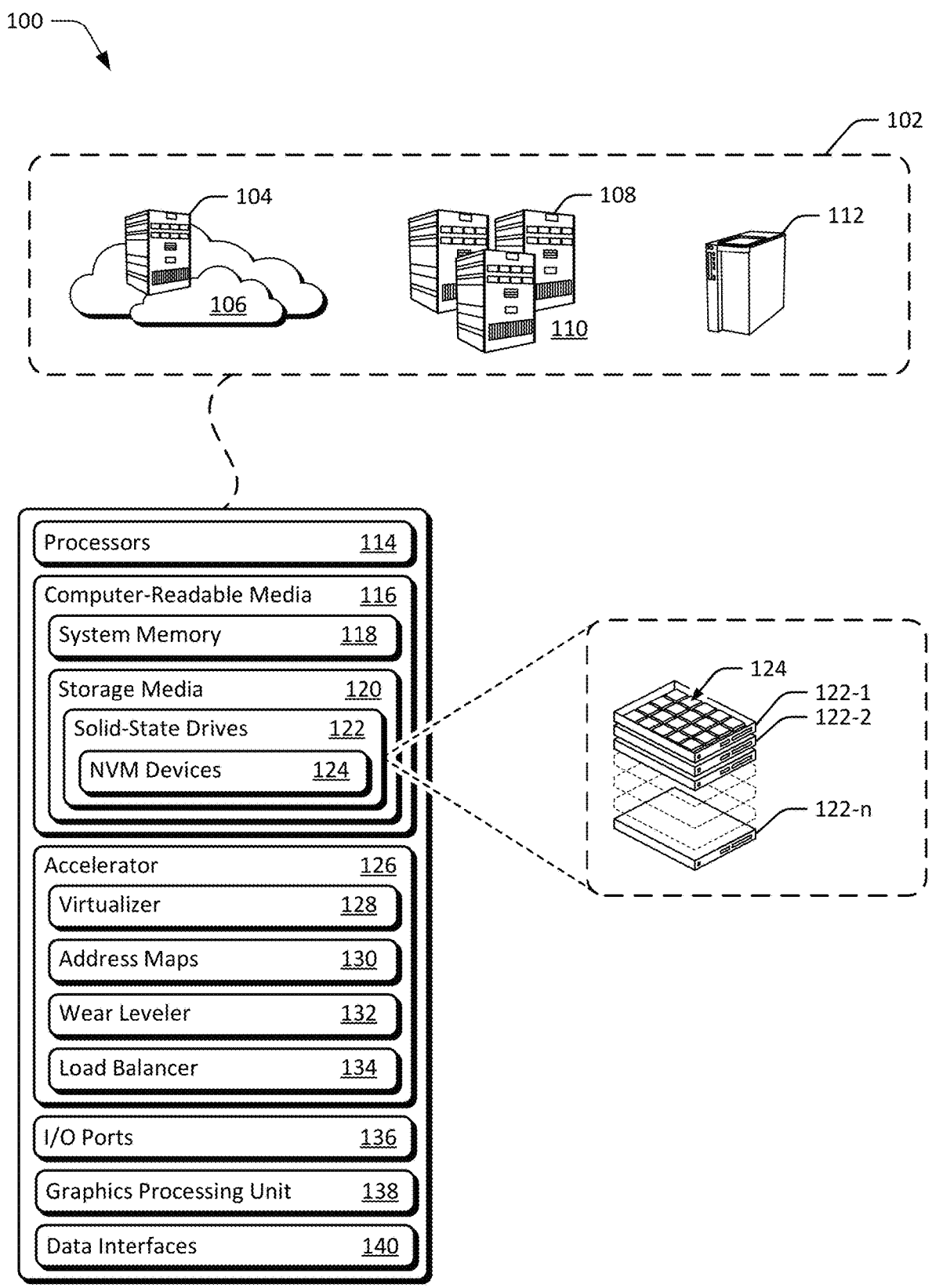
FIG. 1 illustrates an example operating environment having devices in which virtualized areas of solid-state storage media are implemented in accordance with one or more aspects.

Conventional techniques that devices employ for accessing storage memory often rely on interface standards that were designed to access legacy types of storage based on magnetic or optical technologies. The construction and physical properties of solid-state memory, however, are very different from those of hard-disk drives, tape drives, or optical media (e.g., electromechanical storage media). For example, solid-state memory is not organized based on the layout of physical tracks or sectors on a media disk of a hard-disk drive or optical-disk drive. As such, legacy storage interfaces used by most computing devices, which are designed to sequentially access data in tracks or sectors, often have performance issues when accessing data stored in different types of memory media.

In the case of solid-state memory (e.g., NAND Flash memory), inherent side effects caused by write/erase cycles in the solid-state memory may significantly impact read latencies when reading data from the solid-state memory. Typically, solid-state memory drives do not provide visibility into or control of scheduling for when or where the write/erase cycles occur relative to read operations. Thus, the write/erase cycles of the solid-state memory may introduce latency issues with read operations that are delayed or interrupted by the conflicting write/erase cycles. This condition is particularly visible in multi-tenant systems, in which solid-state memory access activities of one initiator affects the performance of other initiators that attempt to access the same solid-state memory.

To address some of these shortcomings, interface standards are being defined that expose low-level information with respect to solid-state memory connectivity and structure that allow an initiator to manipulate access to the solid-state memory to improve access performance. Specifically, by knowing the topology of the solid-state memory, a system or initiator may directly control access of the solid-state memory to ensure traffic of different workloads, or different tenants, is isolated from that of the others. Directly controlling each of the initiators' access into the solid-state memory to provide isolation, however, places a large computational burden back onto the initiators themselves and the supporting host system. In particular, the initiators perform or manage all the activities that are typically handled by the internal solid-state drive controller, such as data routing, channel access, and maintaining a large number of physical memory areas. These low-level activities, when performed by the initiators or a host system, increase loading and overhead on the memory interconnect, host processing resources, system memory, and so on. Thus, having the initiators or host directly control the solid-state memory in order to implement storage isolation is not a cost- or resource-effective solution.

This disclosure describes apparatuses and techniques for virtualizing isolation areas of solid-state storage media. In contrast with conventional access techniques in which a host or initiators directly control all storage media activity, the described apparatuses and techniques may expose isolated units of storage to a host or tenants while offloading other low-level storage media functions from the host. For example, a storage media accelerator coupled between a host and solid-state drive (SSD) may expose virtualized isolation areas of storage to the host for traffic isolation and offload other low-level SSD functions, such as wear leveling, address mapping, and load balancing, to processing and memory resources of the accelerator (e.g., separate from the host compute resources). The storage media accelerator is also scalable, such that the storage media accelerator may manage one SSD or multiple SSDs, with each SSD having one or more virtualized areas of isolated storage (or units of storage) that may be exposed to a host or respective tenants.

Based on an exposed geometry or configuration of NAND of a SSD, the storage media accelerator may create storage "units" of isolation at any suitable granularity, such as an entire SSD, a NAND channel in a SSD, or a NAND device or NAND die on a NAND channel Any physical isolation unit created by the storage media accelerator may be exposed to the host or tenants as a virtualized isolation unit or virtual unit of isolated storage. In some cases, the storage media accelerator maintains address mappings of the virtual storage units to physical areas of storage media and may also remap the physical isolation unit to another area of storage media transparently and without host involvement.

For example, the storage media accelerator may expose a NAND Channel A of a SSD as a virtual block of isolated NAND to a host. As part of a wear leveling or load balancing function, the storage media accelerator may migrate the virtual block of isolated NAND to Channel E on a same or another SSD without the host (e.g., initiator or tenant) being aware that the physical storage media behind the virtualized NAND block of isolation has been physically relocated. Thus, through the use of this virtualization, the storage media accelerator may remap virtual units of isolated storage dynamically to implement a coarse wear leveling across the solid-state memory devices of a drive, or redistribute highly accessed virtual units of isolated storage to completely different SSDs to implement performance-based load balancing without involving the host system.

In various aspects of virtualizing isolation areas of solid-state storage media, a storage media accelerator determines, via a storage media interface, a geometry of solid-state storage media that is coupled to the storage media interface. Based on the geometry of the solid-state storage media, the storage media accelerator selects an area of the solid-state storage media as an isolated unit of storage. The storage media accelerator maps a physical address of the isolated unit of storage to a virtual address through which the isolated unit of storage is accessible.

The storage media accelerator then exposes, via the virtual address, the isolated unit of storage through a host interface to enable host access of the isolated unit of storage in the solid-state storage media. The storage media accelerator may also remap the isolated unit of storage to other areas of the solid-state storage media without host interaction (e.g., notification, interruption, or use of host compute resources). By so doing, the storage media accelerator may provide isolation and partitioning functionalities to tenants (e.g., workloads or initiators) of the host, while efficiently handling lower-level storage media functions, such as wear leveling and load balancing, without host involvement or consumption of host computing resources.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example operating environment 100 having a host device 102, capable of storing or accessing various forms of data, files, objects, or information. Examples of a host device 102 may include a computing cluster 104 (e.g., of a cloud 106), a server 108 or server hardware of a data center 110, or a server 112 (e.g., standalone), any of which may be configured as part of a storage network, storage service, or cloud system. Further examples of host device 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, server blade, gaming console, automotive entertainment device, automotive computing system, automotive control module (e.g., engine or power train control module), and so on. Generally, the host device 102 may communicate or store data for any suitable purpose, such as to enable functionalities of a particular type of device, provide a user interface, enable network access, implement gaming applications, playback media, provide navigation, edit content, provide data storage, or the like.

The host device 102 includes a processor 114 and computer-readable storage media 116. The processor 114 may be implemented as any suitable type or number of processors (e.g., x86 or ARM), either single-core or multi-core, for executing instructions or commands of an operating system or other programs of the host device 102. The computer-readable media 116 (CRM 116) includes system memory 118 and storage media 120. The system memory 118 of the host device 102 may include any suitable type or combination of volatile memory or non-volatile memory. For example, the volatile memory of host device 102 may include various types of random-access memory (RAM), dynamic RAM (DRAM), static RAM (SRAM) or the like. The non-volatile memory may include read-only memory (ROM), electronically erasable programmable ROM (EE-PROM) or Flash memory (e.g., NOR Flash or NAND Flash). These memories, individually or in combination, may store data associated with applications, tenants, workloads, initiators, virtual machines, and/or an operating system of host device 102.

The storage media 120 of the host device 102 may be configured as any suitable type of data storage media, such as a storage device, storage drive, storage array, storage volume, or the like. Although described with reference to the host device 102, the storage media 120 may also be implemented separately as a standalone device or as part of a larger storage collective, such as a data center, server farm, or virtualized storage system (e.g., for cloud-based storage or services). Examples of the storage media 120 include a hard-disk drive (HDD, not shown), an optical-disk drive (not shown), a solid-state drive 122 (SSD 122), and/or an SSD array of SSDs 122-1 through 122-$n$ as shown in FIG. 1, where n is any suitable integer or number of SSDs.

Each of the SSDs 122 includes or is formed from non-volatile memory devices 124 (NVM devices 124) on which data or information of the host device 102 or other sources is stored. The NVM devices 124 may be implemented with any type or combination of solid-state memory media, such Flash, NAND Flash, NAND memory, RAM, DRAM (e.g., for caching), SRAM, or the like. In some cases, the data stored to the NVM devices 124 may be organized into files of data (e.g., content) or data objects that are stored to the SSDs 122 and accessed by the host device 102 or tenants, workloads, or initiators of the host device. The types, sizes, or formats of the files may vary depending on a respective source, use, or application associated with the file. For example, the files stored to the SSDs 122 may include audio files, video files, text files, image files, multimedia files, spreadsheets, and so on.

In this example, the host device 102 includes a storage media accelerator 126 (accelerator 126) capable of implementing aspects of virtualizing isolation areas of solid-state storage media. The accelerator 126 includes a virtualizer 128, address maps 130, a wear leveler 132, and a load balancer 134, each of which may be implemented to perform respective operations or functions associated with virtualizing isolation areas of solid-state storage media. For example, the virtualizer 128 may determine a geometry of solid-state storage media and select, based on the geometry, an area of the solid-state storage media or an isolated unit of storage. The virtualizer 128 may then associate, in the address maps 130, a physical address of area selected for the isolated unit of storage to a virtual address through which the isolated unit of storage is accessible. The isolated unit of storage is then exposed by the virtualizer 128, via the virtual address, through a host interface to enable host access of the isolated unit of storage in the solid-state storage media.

In various aspects, the wear leveler 132 or load balancer 134 remaps the isolated unit of storage to other areas of the solid-state storage media without host interaction (e.g., notification, interruption, or use of host processing/memory resources). By so doing, the wear leveler 132 may dynamically implement a coarse wear leveling across the solid-state memory devices of a drive, or the load balancer 134 may redistribute highly accessed virtual units of isolated storage to completely different SSDs to implement performance-based load balancing without involving the host system. How these entities are implemented and used varies and is described throughout this disclosure.

The host device 102 may also include I/O ports 136, a graphics processing unit 138 (GPU 138), and data interfaces 140. Generally, the I/O ports 136 allow a host device 102 to interact with other devices, peripherals, or users. For example, the I/O ports 136 may include or be coupled with a universal serial bus, human interface devices, audio inputs, audio outputs, or the like. The GPU 138 processes and renders graphics-related data for host device 102, such as user interface elements of an operating system, applications, or the like. In some cases, the GPU 138 accesses a portion of local memory to render graphics or includes dedicated memory for rendering graphics (e.g., video RAM) of the host device 102.

The data interfaces 140 of the host device 102 provide connectivity to one or more networks and other devices connected to those networks. The data interfaces 140 may include wired interfaces, such as Ethernet or fiber optic interfaces for communicating over a local network, intranet, or the Internet. Alternately or additionally, the data interfaces 140 may include wireless interfaces that facilitate communication over wireless networks, such as wireless LANs, wide-area wireless networks (e.g., cellular networks), and/or wireless personal-area-networks (WPANs). Any of the data communicated through the I/O ports 136 or the data interfaces 140 may be written to or read from the storage media 120 of the host device 102 in accordance with one or more aspects virtualizing isolation areas of solid-state storage media.

Figure 2:
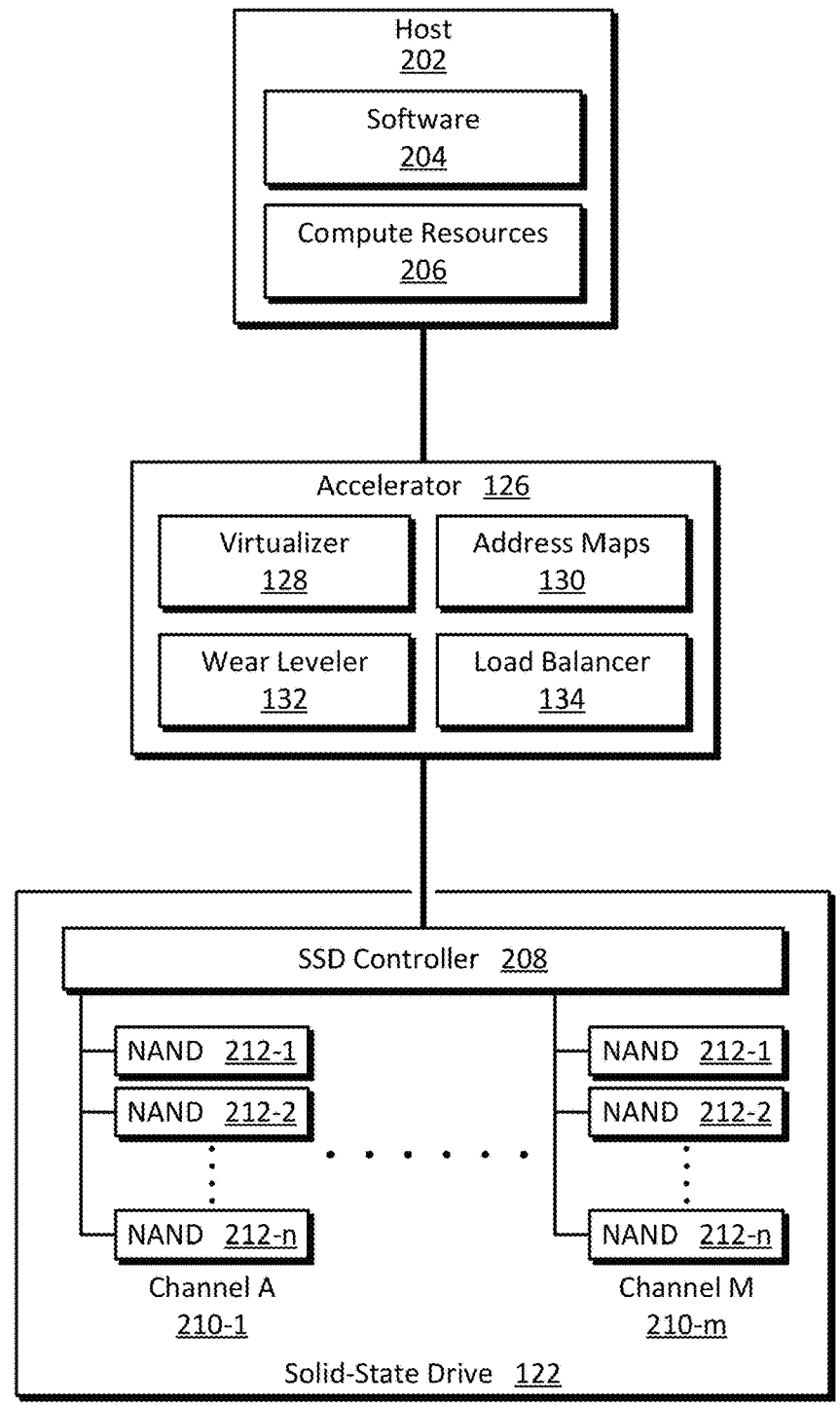
FIG. 2 illustrates example configurations of a storage media accelerator and solid-state storage media shown in FIG. 1.

FIG. 2 illustrates example configurations of a storage media accelerator 126 and SSD 122 generally at 200, which are implemented in accordance with one or more aspects of virtualizing isolation areas of solid-state storage media. In this example, the accelerator 126 is operably coupled between a host 202 and the SSD 122 from which virtualized areas of isolated storage are provided. The host 202 includes software 204, such as applications, virtual machines, or tenants (not shown), that execute on compute resources 206 of the host. In some cases, the compute resources 206 include a combination of processing resources and system memory of the host 202 that are used to implement the applications, virtual machines, tenants, or initiators. The accelerator 126 may provide isolated access to virtualized units of storage to each virtual machine, tenant, or initiator, while offloading lower-level storage media functions from the compute resources 206.

Generally, the tenants or initiators of the host 202 access data stored in the SSD 122 coupled to the accelerator 126. In this example, the SSD 122 is implemented with an SSD controller 208 through which channels 210-1 through 120-m of NAND are accessible. Each channel 210 of NAND (e.g., channel A or NAND channel 210) includes multiple NAND devices 212-1 through 212-n, which may be implemented as separate NAND devices or NAND dies of the SSD 122 that are accessible or addressable through a respective NAND channel 210. In aspects of virtualizing isolation areas, the accelerator 126 may select any NAND device 212 or NAND channel 210 for virtualization. For example, the accelerator 126 may map a physical NAND device 212 to a virtual storage unit address in the address maps 130. The virtual storage unit, or virtual unit of storage, is then exposed by the accelerator 126 to the host 202, such as to a virtual machine or tenant application of the host 202. By mapping an entire physical channel, device, or die of NAND memory to the virtual address, the accelerator 126 may provide isolated storage to the virtual machine or tenant that is isolated from other applications, virtual machines, initiators, or tenants of the host 202.

Figure 3:
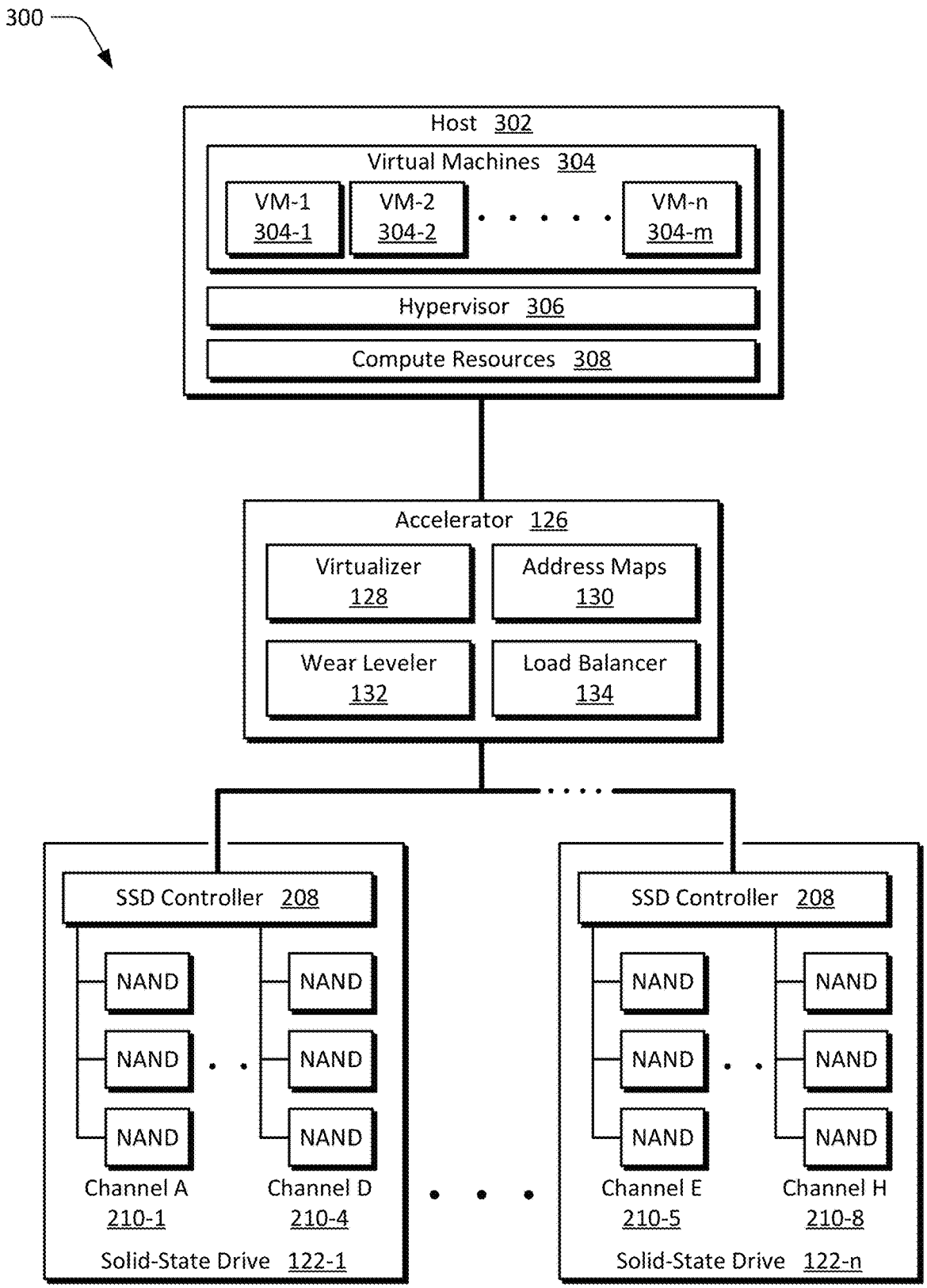
FIG. 3 illustrates an example configuration of a storage media accelerator associated with multiple solid-state drives in accordance with one or more aspects.

FIG. 3 illustrates an example configuration of a storage media accelerator 126 and an array of n SSDs 122 generally at 300, which are implemented in accordance with one or more aspects of virtualizing isolation areas of solid-state storage media. In this example, the accelerator 126 is operably coupled between a host 302 and an array of SSDs 112-1 through 122-n from which virtualized areas of isolated storage are provided. The host 302 may be implemented as a multi-tenant host with virtual machines 304, which may be implemented with any suitable number of virtual machines 304-1 through 304-m. The virtual machines 304 execute from a hypervisor 306 that executes on the compute resources 308 of the host 302. Alternately or additionally, the compute resources 308 may include a combination of processing resources and system memory of the host 302 that are used to implement the virtual machines 304 through which tenants or initiators operate. The accelerator 126 may provide isolated access to virtualized units of storage to each virtual machine 304-1 through 304-m, tenant, or initiator, while offloading lower-level storage media functions from the compute resources 308 of the host 302.

Generally, the virtual machines 304 of the host 302 access data stored in the array of SSDs 122 coupled to the accelerator 126. In this example, each SSD 122 of the SSD array is implemented with an SSD controller 208 by which four channels 210 of NAND (e.g., A-D or E-H) are accessible. Each channel 210 of NAND (e.g., channel E or NAND channel 210-5) includes multiple NAND devices or NAND dies. In aspects of virtualizing isolation areas, the accelerator 126 may select any SSD 122, NAND channel 210, or NAND devices as a storage area for virtualization. For example, the accelerator 126 may map SSD 122-1 to a virtual storage unit address in the address maps 130. The virtual storage unit, or virtual unit of storage, is then exposed by the accelerator 126 to the host 302, such as to a virtual machine 304 or tenant application of the host 302. By mapping an entire SSD, physical channel, device, or die of NAND memory to the virtual address, the accelerator 126 may provide isolated storage to the virtual machine 304 or tenant that is isolated from other applications, virtual machines 304, initiators, or tenants of the host 302.

Figure 4:
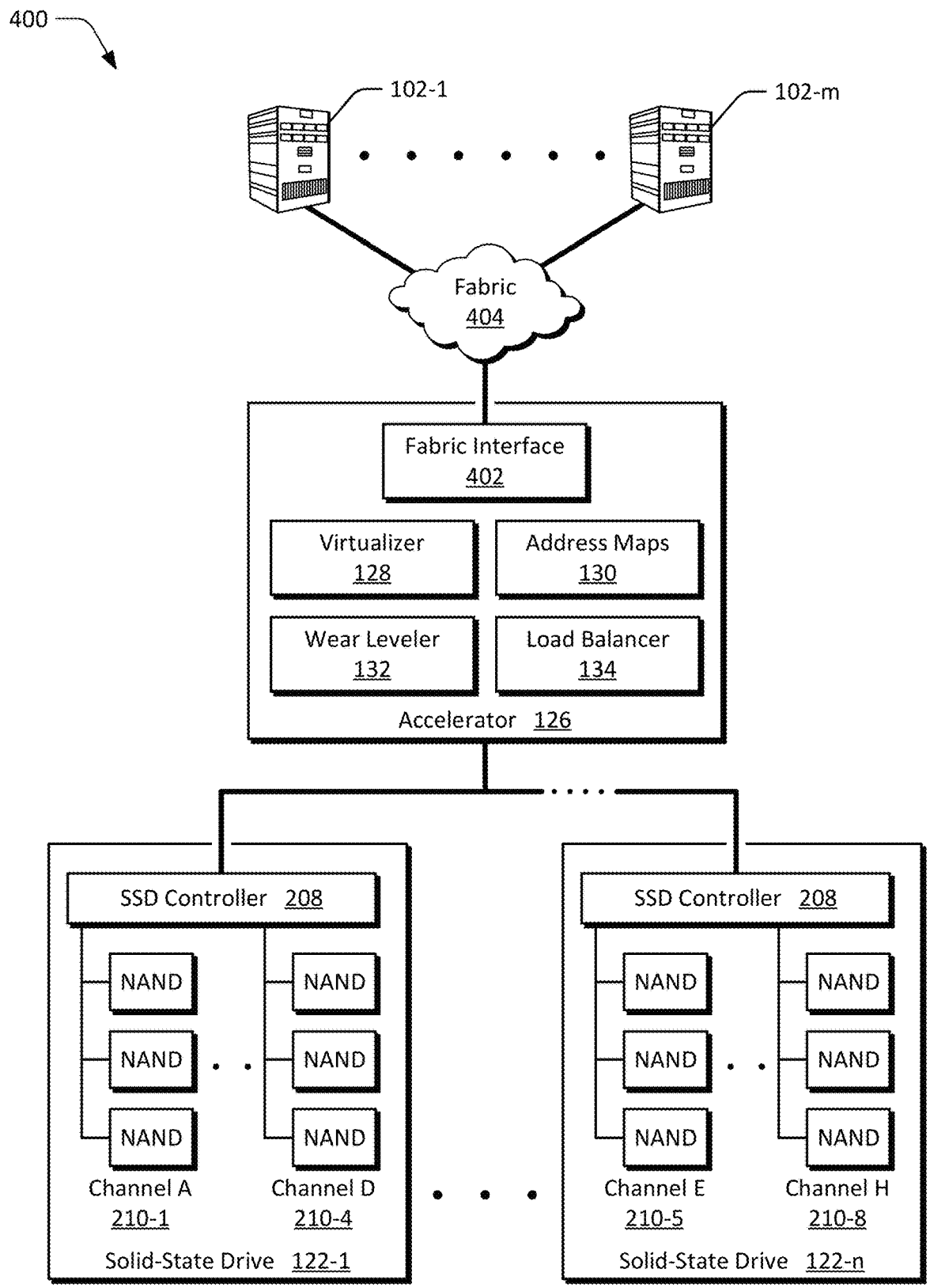
FIG. 4 illustrates an example configuration of a Fabric-enabled storage media accelerator implemented in accordance with one or more aspects.

FIG. 4 illustrates an example configuration of a Fabric-enabled storage media accelerator generally at 400, which is implemented in accordance with one or more aspects of virtualizing isolation areas of solid-state storage media. In this example, the accelerator 126 includes a Fabric interface (402) and is operably coupled between an instance of a Fabric 404 and an array of SSDs 122-1 through 122-n. The Fabric interface 402 may include an NVM over Fabric (NVM-OF) interface, such as a Non-Volatile Memory Express (NVMe) over Ethernet, InfiniBand, or Fibre Channel (FC) interface. As such, the accelerator 126 may be implemented as a Fabric-enabled storage target in a disaggregated storage system.

Through the Fabric 404, any of the multiple host devices 102-1 though 102-m may access the SSD 122 array through the accelerator 126. Here, each SSD 122 of the SSD array is implemented with an SSD controller 208 by which four channels 210 of NAND (e.g., A-D or E-H) are accessible. Each channel 210 of NAND (e.g., channel E or NAND channel 210-5) includes multiple NAND devices or NAND dies. In aspects of virtualizing isolation areas, the accelerator 126 may select any SSD 122, NAND channel 210, or NAND devices as a storage area for virtualization. For example, the accelerator 126 may map SSD 122-1 to a virtual storage unit address in the address maps 130. The virtual storage unit, or virtual unit of storage, is then exposed by the accelerator 126 to the host device 102, such as to a virtual machine or tenant application of one of the host devices 102. By mapping an entire SSD, physical channel, device, or die of NAND memory to the virtual address, the accelerator 126 may provide isolated storage to the virtual machine or tenant that is isolated from other host devices, applications, virtual machines, initiators, or tenants.

Techniques for Virtualizing Isolation Areas of Storage Media

The following discussion describes techniques of virtualizing isolation areas of solid-state storage media, which may provide storage isolation and partition functionalities to a host while offloading lower-level storage media functions, such as wear leveling, load balancing, or the like, to a storage media accelerator. These techniques may be implemented using any of the environments and entities described herein, such as the accelerator 126, virtualizer 128, address maps 130, wear leveler 132, or load balancer 134. These techniques include methods illustrated in FIG. 5, FIG. 6, FIG. 8, and FIG. 10 each of which is shown as a set of operations performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to expose virtualized isolation areas of storage media while transparently providing wear leveling, load balancing, or data migration without host interaction or involvement. In portions of the following discussion, reference will be made to the operating environment 100 of FIG. 1 and entities of FIG. 2, FIG. 3, and/or FIG. 4 by way of example. Such reference is not to be taken as limiting described aspects to the operating environment 100, entities, or configurations, but rather as illustrative of one of a variety of examples. Alternately or additionally, operations of the methods may also be implemented by or with entities described with reference to the System-on-Chip of FIG. 10 and/or the storage media accelerator of FIG. 11.

Figure 5:
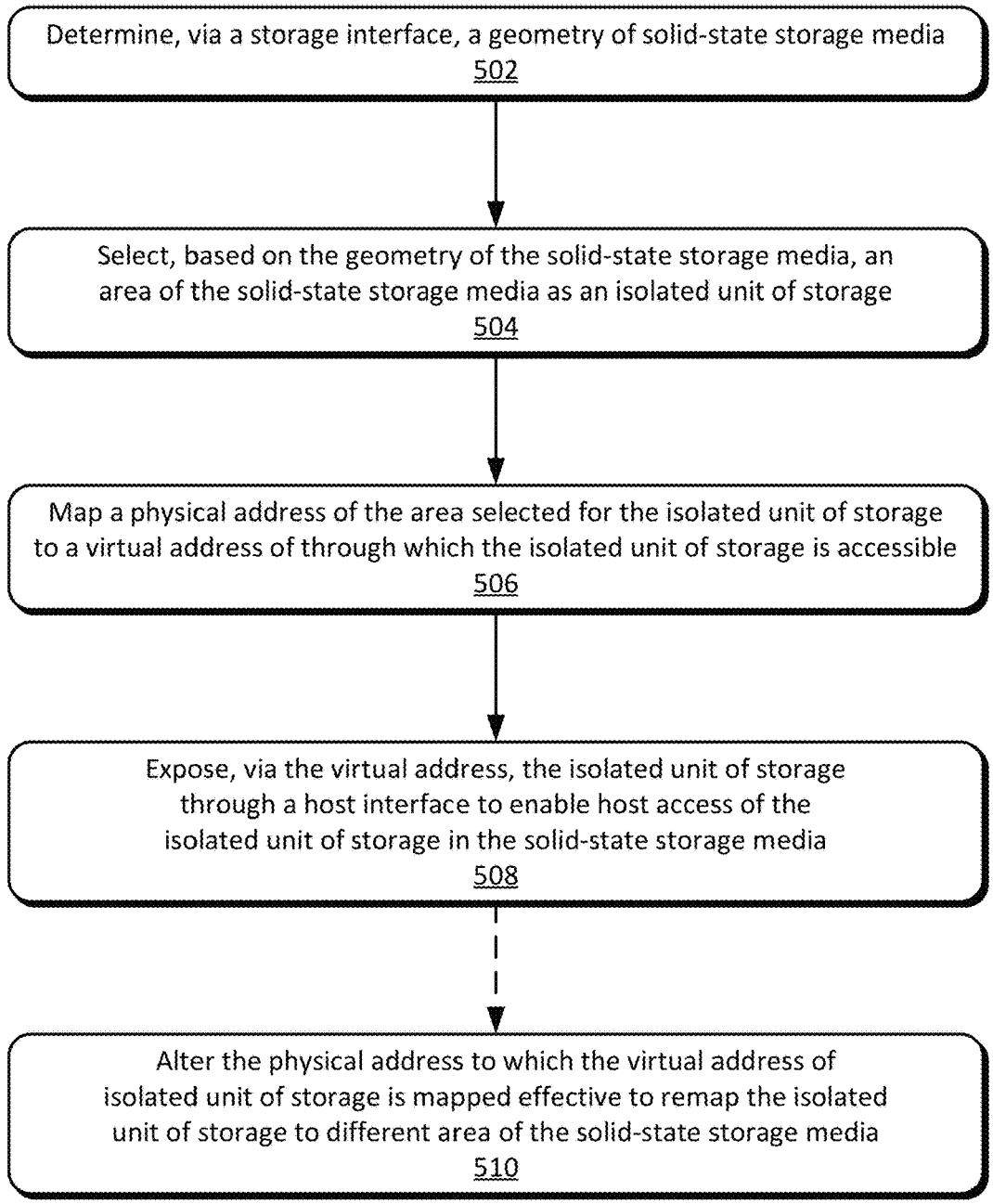
FIG. 5 depicts an example method for virtualizing isolation areas of solid-state storage media in accordance with one or more aspects.

FIG. 5 depicts an example method 500 for virtualizing isolation areas of solid-state storage media, including operations performed by or with the accelerator 126, virtualizer 128, address maps 130, wear leveler 132, or load balancer 134.

At 502, an accelerator determines, via a storage interface, a geometry of solid-state storage media. The solid-state storage media may expose the geometry to the accelerator, such as through an open-channel SSD or project Denali compliant interface. In some cases, the geometry includes an architecture, topology, configuration, available control features, or other parameters of a drive in which the solid-state storage media is implemented. Alternately or additionally, the geometry of the solid-state storage media may include a logical geometry, a physical geometry, a number of channels, a number of logical units, a number of parallel units, a number of chunks, a chunk size, or a minimum write size of the solid-state storage media.

At 504, the accelerator selects, based on the geometry of the solid-state media, an area of the solid-state storage media as an isolated unit of storage. The area selected as the isolated unit of storage may include any granularity or subdivision of solid-state storage, such as an entire SSD, a memory channel of a SSD, a memory device of a SSD, or a memory die of a SSD.

At 506, the accelerator maps a physical address of the area selected for the isolated unit of storage to a virtual address through which the isolated unit of storage is accessible. The accelerator may maintain this mapping, as well as other mappings of physical to virtual addresses for isolated units of storage. By so doing, the address mapping function can be offloaded from a host or handled by the accelerator outside of a SSD or SSD controller.

At 508, the accelerator exposes, via the virtual address, the isolated unit of storage through a host interface to enable host access of the isolated unit of storage in the solid-state storage media. In some cases, the isolated unit of storage is associated with an initiator, a workload, a virtual machine, or a tenant of the host. In such cases, the isolated unit of storage is isolated from another initiator, another workload, another virtual machine, or another tenant of the host. Alternately or additionally, the solid-state storage media may be configured as nearline or direct attached storage of a host device.

Optionally at 510, the accelerator alters the physical address to which the virtual address of the isolated unit of storage is mapped. This may be effective to remap the isolated unit of storage to a different area of the solid-state storage media. In some cases, the physical address is remapped to another area of a SSD as part of a wear leveling function or algorithm In other cases, the physical address is remapped to another SSD as part of a load balancing function or algorithm implemented by the accelerator.

Figure 6:
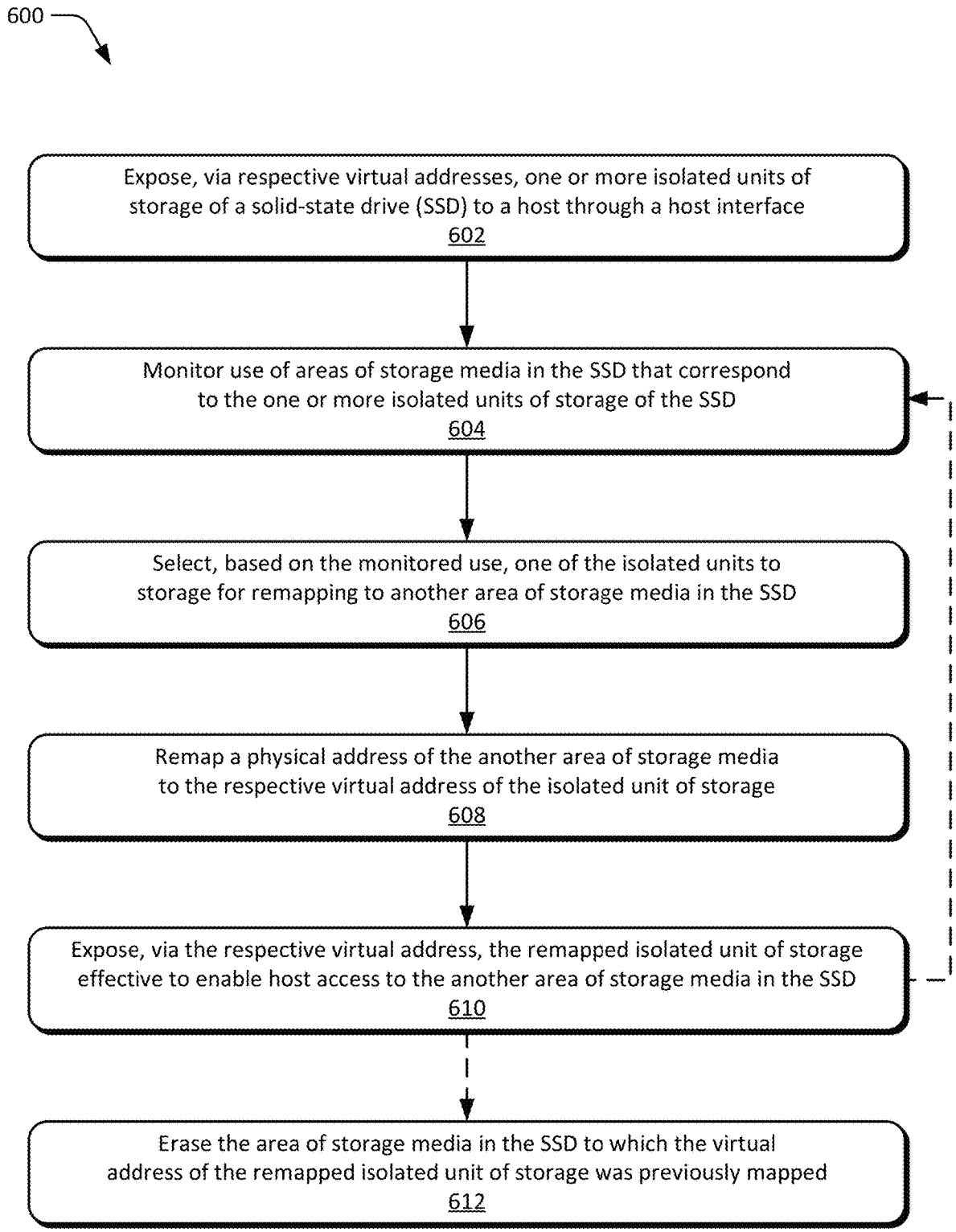
FIG. 6 depicts an example method for remapping an isolated unit of storage to another area of storage media in a solid-state drive (SSD).

FIG. 6 depicts an example method 600 for remapping an isolated unit of storage to another area of storage media in a SSD. The operations of method 600 may be performed by or with the accelerator 126, virtualizer 128, address maps 130, wear leveler 132, or load balancer 134.

Figure 7:
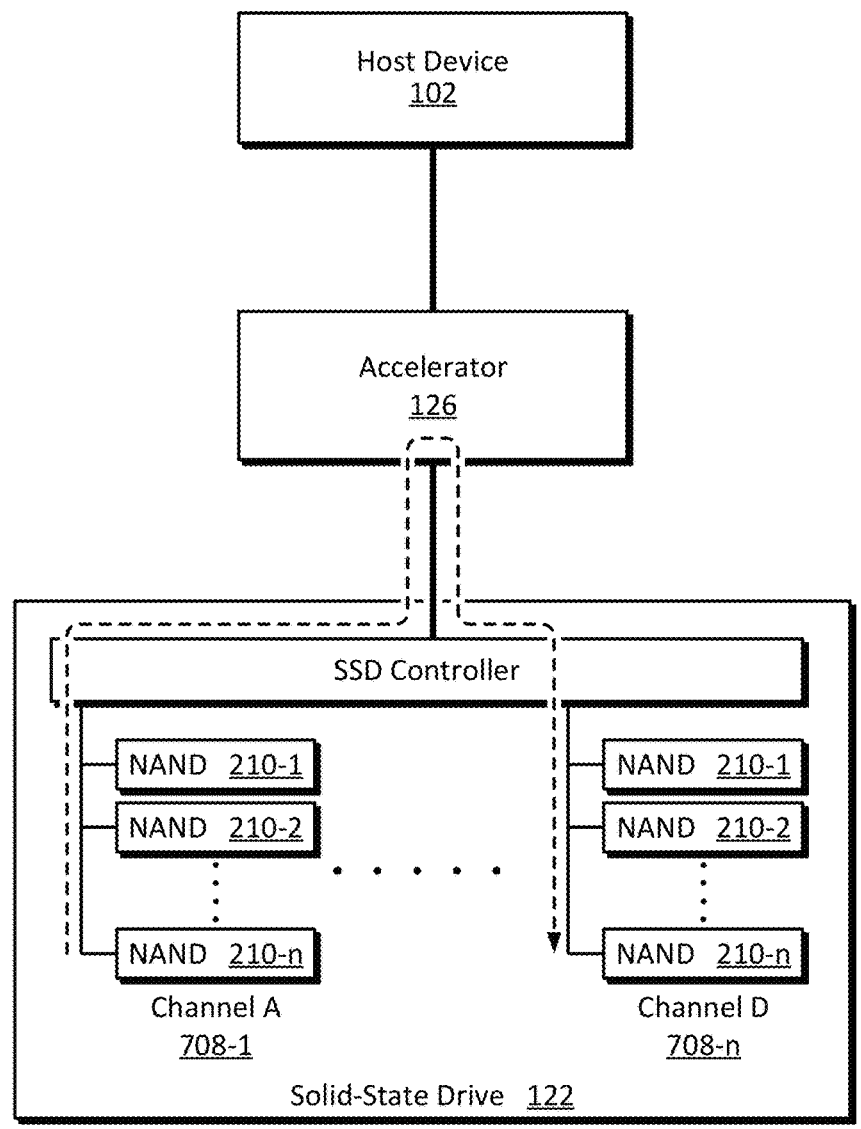
FIG. 7 illustrates an example of mapping an isolated channel of storage to another channel of a SSD without host interaction.

At 602, an accelerator exposes, via respective virtual addresses, one or more isolated units of storage of a SSD to a host through a host interface. The virtualized isolated units of storage may correspond to a NAND channel of a SSD, a NAND device of a SSD, or a NAND die of a SSD. By way of example, consider FIG. 7 in which NAND channel A is exposed to the host device as a unit of isolated storage. A tenant or workload of the host device may access the NAND channel A as isolated storage without conflicting traffic from other tenants or initiators.

At 604, the accelerator monitors use of areas of storage media in the SSD that correspond to the one or more isolated units of storage of the SSD. In some cases, a wear leveler of the accelerator monitors use or access of NAND channels, NAND devices, or NAND dies of the SSD to which the isolated units of storage correspond. In the context of the present example, assume the tenant of the host device accesses NAND channel A more than other areas of the SSD are accessed.

At 606, the accelerator selects, based on the monitored use, one of the isolated units of storage for remapping to another area of storage media in the SSD. For example, the accelerator may select an isolated unit of storage that corresponds to a heavily a used NAND channel, NAND device, of NAND die of the SSD for remapping. As described herein, the accelerator may remap virtualized isolation areas without host interaction or use of host resources. Continuing the ongoing example, the accelerator selects NAND channel A for remapping to another area of the SSD.

At 608, the accelerator remaps a physical address of the another area of storage media to the respective virtual address of the isolated unit of storage. By remapping the virtual address of the isolated unit of storage, the accelerator may dynamically implement wear leveling by redirecting access to the another area of storage media. In the context of the present example in FIG. 7, the accelerator remaps a physical address for the tenant's isolated unit of storage from NAND channel A to NAND channel D of the SSD.

At 610, the accelerator exposes, via the respective virtual address, the remapped isolated unit of storage to the host through the host interface. This may be effective to enable host access to the another area of storage media in the SSD through the virtual address of the isolated unit of storage. Due to the virtual addressing of the isolated unit of storage, the remapping is transparent to the host or tenant, and also requires no host interaction or resources due to offloading provided by the accelerator. Concluding the present example, the accelerator migrates data from NAND channel A to NAND channel D in the SSD and redirects, via the virtual address, access by the tenant of the host device to NAND channel D for subsequent data access.

Optionally at 612, the accelerator erases the area of storage media in the SSD to which the virtual address of the remapped isolated unit of storage was previously mapped. This may be effective to free the area of storage media for reallocation or reuse with another isolated unit of storage in the SSD.

Figure 8:
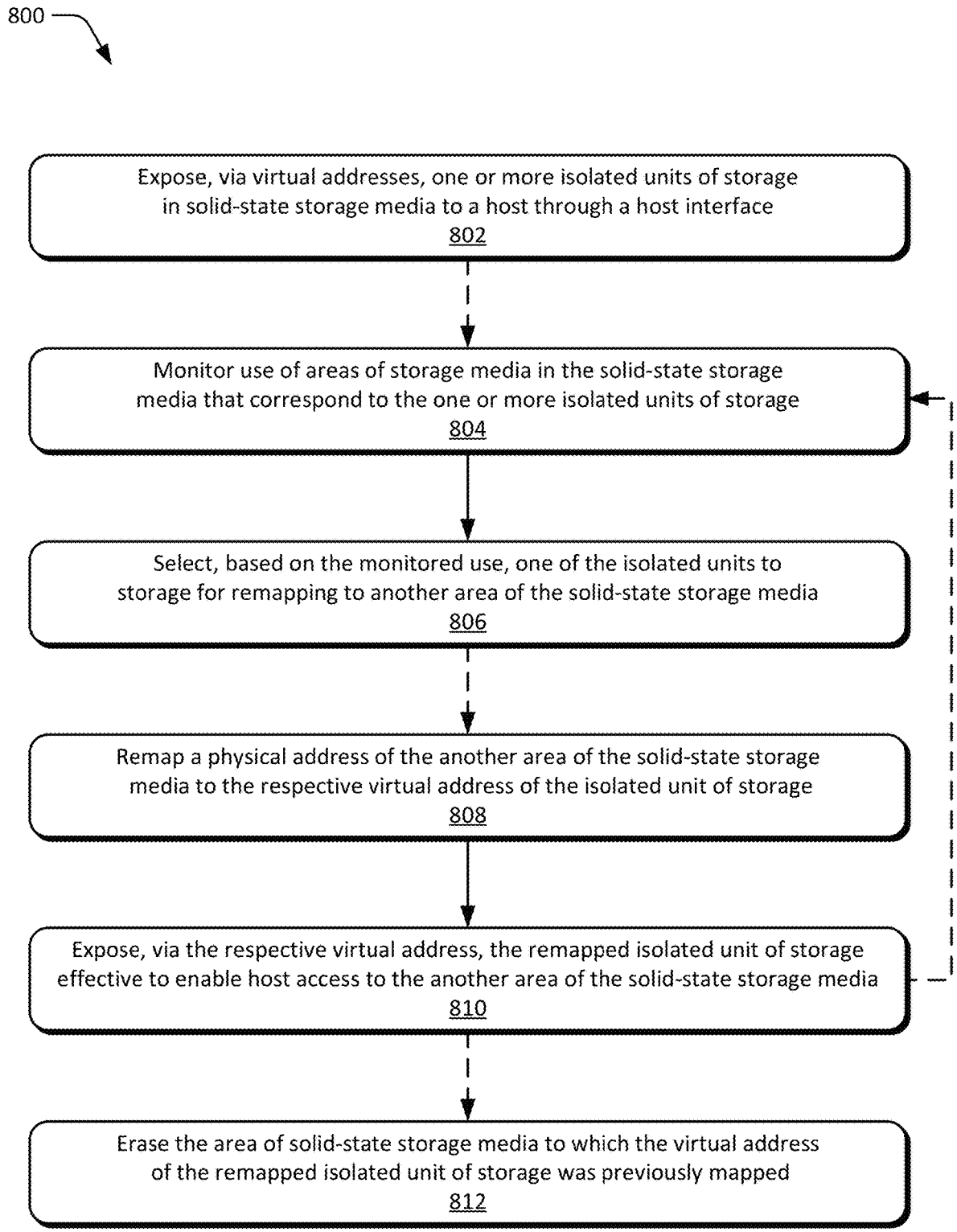
FIG. 8 depicts an example method for remapping an isolated unit of storage to another SSD in accordance with one or more aspects.

FIG. 8 depicts an example method 800 for remapping an isolated unit of storage to another SSD, including operations performed by or with the accelerator 126, virtualizer 128, address maps 130, wear leveler 132, or load balancer 134.

Figure 9:
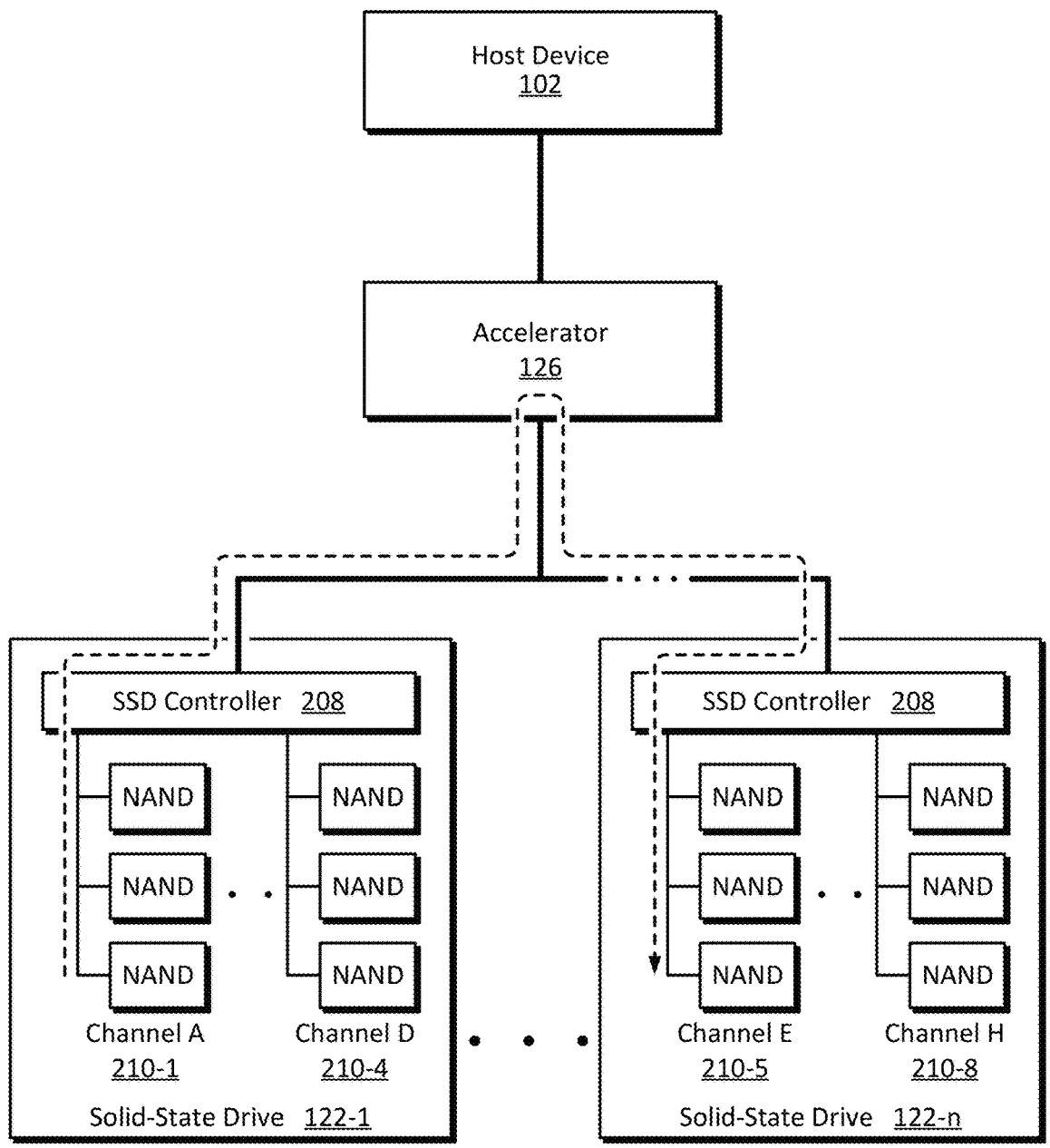
FIG. 9 illustrates an example of mapping an isolated drive of solid-state storage media to another drive of solid-state storage media without host interaction.

At 802, an accelerator exposes, via respective virtual addresses, one or more isolated units of storage in solid-state storage media to a host through a host interface. The virtualized isolated units of storage may correspond to a SSD, a NAND channel of a SSD, a NAND device of a SSD, or a NAND die of a SSD. By way of example, consider FIG. 9 in which NAND channel A of a first SSD of a SSD array is exposed to the host device as a unit of isolated storage. A tenant or workload of the host device may access the NAND channel A as isolated storage without conflicting traffic from other tenants or initiators.

At 804, the accelerator monitors use of areas of storage media in the solid-state storage media that correspond to the one or more isolated units of storage. In some cases, a load balancer of the accelerator monitors use or access between SSDs or respective areas of SSDs to which the isolated units of storage correspond. In the context of the present example, assume the tenant of the host device accesses NAND channel A of the SSD 122-1 more than other SSDs in the array are accessed.

At 806, the accelerator selects, based on the monitored use, one of the isolated units of storage for remapping to another area of storage media in the solid-state storage media. For example, the accelerator may select an isolated unit of storage that corresponds to a heavily used or accessed SSD for remapping. As described herein, the accelerator may remap virtualized isolation areas to different SSDs without host interaction or use of host resources. Continuing the ongoing example, the accelerator selects SSD 122-1 for remapping to another SSD of the array.

At 808, the accelerator remaps a physical address of the another area of storage media to the respective virtual address of the isolated unit of storage. By remapping the virtual address of the isolated unit of storage, the accelerator may dynamically implement load balancing by redirecting access to the another area of storage media. In the context of the present example in FIG. 9, the accelerator remaps a physical address for the tenant's isolated unit of storage from NAND channel A of SSD 122-1 to NAND channel E of the SSD 122-n in the array.

At 810, the accelerator exposes, via the respective virtual address, the remapped isolated unit of storage to the host through the host interface. This may be effective to enable host access to the another area of storage media in the solid-state storage media through the virtual address of the isolated unit of storage. Concluding the present example, the accelerator migrates data from NAND channel A of SSD 122-1 to NAND channel E of SSD 122-n and redirects, via the virtual address, access by the tenant of the host device from SSD 122-1 to SSD 122-n for subsequent data access.

Optionally at 812, the accelerator erases the area of storage media in the solid-state storage media to which the virtual address of the remapped isolated unit of storage was previously mapped. This may be effective to free the area of storage media for reallocation or reuse with another isolated unit of storage in the solid-state storage media. For example, the accelerator may erase a SSD, a NAND channel, a NAND device, or a NAND die of data to clear the storage area.

Figure 10:
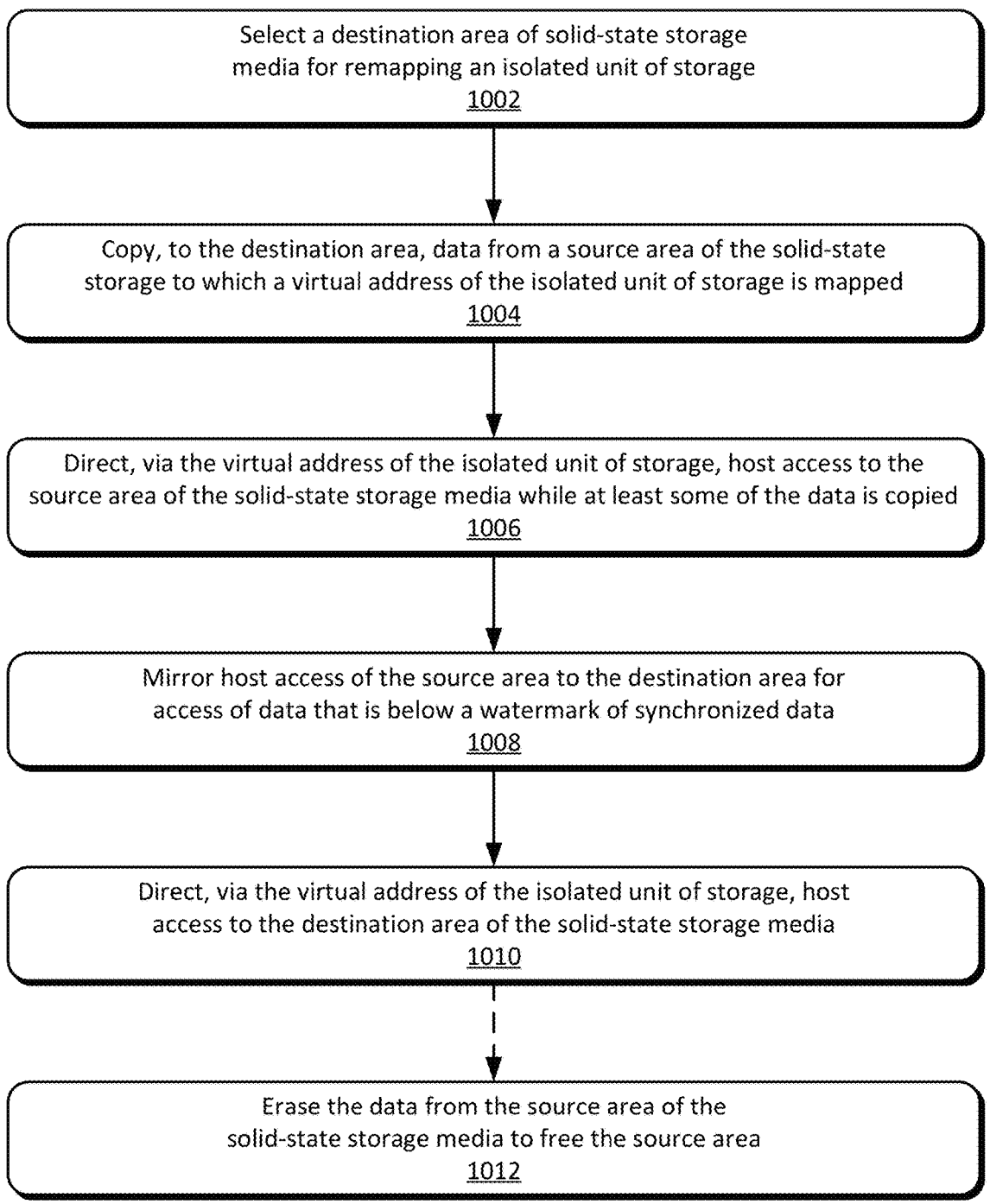
FIG. 10 depicts an example method for migrating data of a virtualized isolation area from a source area of storage media to a destination area of storage media.

FIG. 10 depicts an example method 1000 for migrating data of a virtualized isolation area from a source area of storage media to a destination area of storage media. The operations of method 1000 may be performed by or with the accelerator 126, virtualizer 128, address maps 130, wear leveler 132, or load balancer 134.

At 1002, an accelerator selects a destination area of solid-state storage media for remapping an isolated unit of storage. The destination area may include an entire SSD, a NAND channel of a SSD, or a NAND device of a SSD.

At 1004, the accelerator copies, to the destination area, data from a source area of solid-state storage media to which a virtual address of the isolated unit of storage is mapped. At 1006, the accelerator directs, via the virtual address of the isolated unit of storage, host access to the source area of the solid-state storage media while at least some of the data is copied. For example, the accelerator may copy data from an active isolation unit of storage to a spare unit while at least some read/write access continues to be directed to the active isolation unit of storage.

At 1008, the accelerator mirrors host access of the source area to the destination area for access of data that is below a watermark of synchronized data. In other words, new writes to the active isolation unit that are directed below a watermark of data already copied to the spare isolation unit may be mirrored to both units for data coherency during the migration.

At 1010, the accelerator directs, via the virtual address of the isolated unit of storage, host access to the destination area of the solid-state storage media. Responsive to synchronization between the active isolation unit of storage and the destination area, the accelerator may redirect access made through the virtual address to the new unit of storage where the copied data resides. Optionally at 1012, the accelerator erases the data from the source area of the solid-state media to free the source area.

Figure 11:
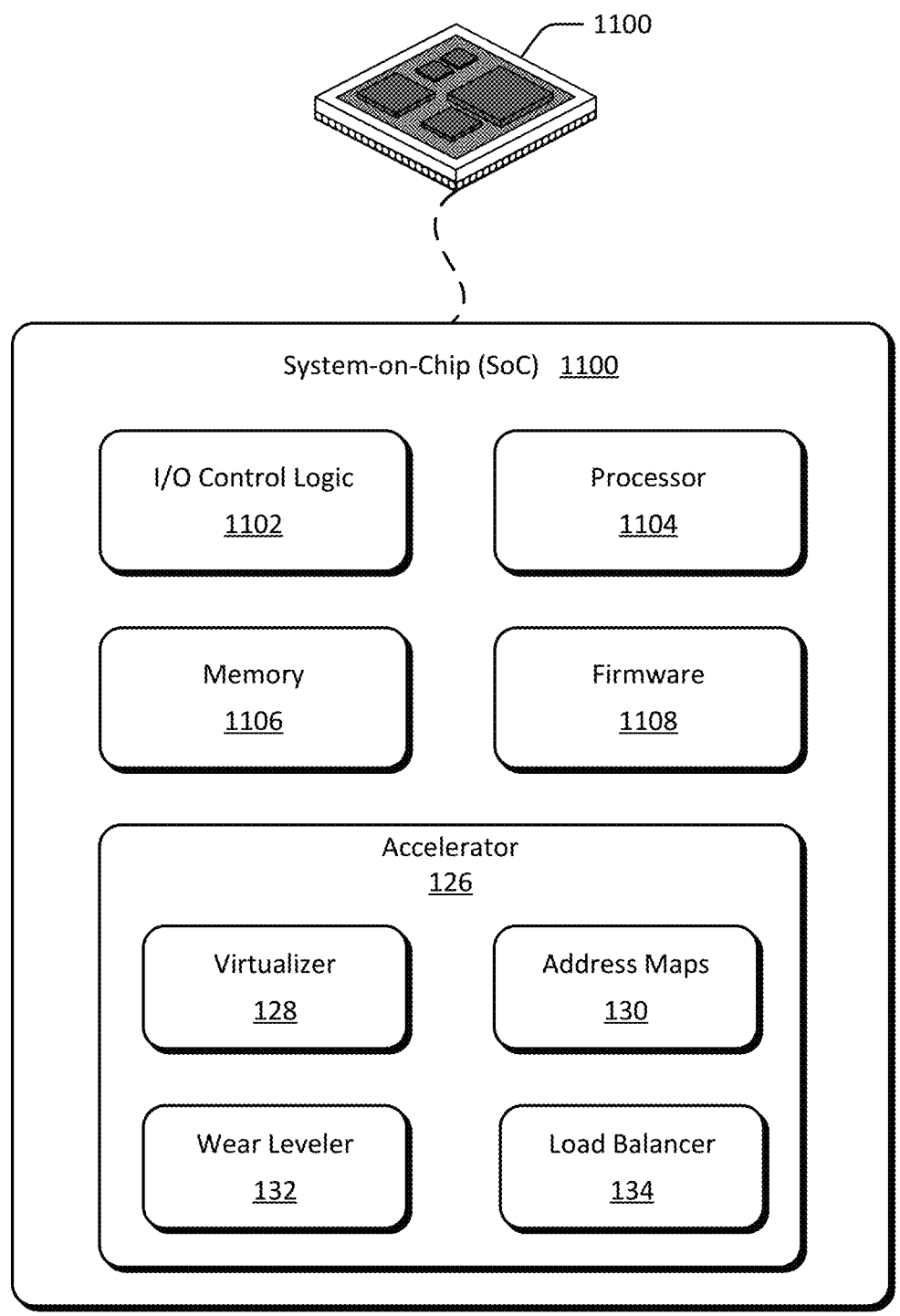
FIG. 11 illustrates an example System-on-Chip (SoC) environment for implementing aspects of virtualizing areas of solid-state storage media.

System-on-Chip FIG. 11 illustrates an exemplary System-on-Chip (SoC) 1100 that may implement various aspects of virtualizing isolation areas of solid-state storage media. The SoC 1100 may be implemented in any suitable device, such as a computing device, host device, network-attached storage, smart appliance, printer, set-top box, server, data center, solid-state drive (SSD), storage drive array, memory module, automotive computing system, server, server blade, storage blade, storage backplane, storage media expansion device, storage media card, storage media adapter, network attached storage, Fabric-enabled storage target, NVMe-based storage controller, or any other suitable type of device (e.g., others described herein). Although described with reference to a SoC, the entities of FIG. 11 may also be implemented as other types of integrated circuits or embedded systems, such as an application-specific integrated-circuit (ASIC), storage controller card, storage backplane, storage controller, communication controller, application-specific standard product (ASSP), digital signal processor (DSP), programmable SoC (PSoC), system-in-package (SiP), or field-programmable gate array (FPGA).

The SoC 1100 may be integrated with electronic circuitry, a microprocessor, memory, input-output (I/O) control logic, communication interfaces, firmware, and/or software useful to provide functionalities of a host device or storage system, such as any of the devices or components described herein (e.g., storage drive or storage array). The SoC 1100 may also include an integrated data bus or interconnect fabric (not shown) that couples the various components of the SoC for data communication or routing between the components. The integrated data bus, interconnect fabric, or other components of the SoC 1100 may be exposed or accessed through an external port, parallel data interface, serial data interface, peripheral component interface, or any other suitable data interface. For example, the components the SoC 1100 may access or control external storage media through an external interface or off-chip data interface.

In this example, the SoC 1100 includes various components such as input-output (I/O) control logic 1102 and a hardware-based processor 1104 (processor 1104), such as a microprocessor, processor core, application processor, DSP, or the like (e.g., processing resource separate from a host x86 processor). The SoC 1100 also includes memory 1106, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1104 and code stored on the memory 1106 are implemented as a storage media accelerator or accelerator-enabled storage aggregator to provide various functionalities associated with virtualizing isolation areas of solid-state storage media. In the context of this disclosure, the memory 1106 stores data, code, instructions, or other information via non-transitory signals, and does not include carrier waves or transitory signals. Alternately or additionally, SoC 1100 may comprise a data interface (not shown) for accessing additional or expandable off-chip storage media, such as magnetic memory or solid-state memory (e.g., Flash or NAND memory).

The SoC 1100 may also include firmware 1108, applications, programs, software, and/or operating systems, which may be embodied as processor-executable instructions maintained on the memory 1106 for execution by the processor 1104 to implement functionalities of the SoC 1100. The SoC 1100 may also include other communication interfaces, such as a transceiver interface for controlling or communicating with components of a local on-chip (not shown) or off-chip communication transceiver. Alternately or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 1100. For example, the SoC 1100 may include a transceiver interface configured to enable storage over a wired or wireless network, such as to provide a network attached storage (NAS) volume with virtualized storage isolation features.

The SoC 1100 also includes an accelerator 126 with a virtualizer 128, address maps 130, wear leveler 132, and load balancer 134, which may be implemented separately as shown or combined with a storage component or data interface. In accordance with various aspects of virtualizing isolation areas of solid-state storage media, the accelerator 126 may expose virtualized units of storage to a host or tenants and offload other storage media management functions to the processor 1104 of the accelerator, such as wear leveling, load balancing, or the like. Alternately or additionally, the address maps 130 may be stored on the memory 1106 of the SoC 1100 or on a memory operably coupled with the SoC 1100 and accessible to the accelerator 126.

Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIG. 2, FIG. 3, and/or FIG. 4. The accelerator 126, either in whole or part, may be implemented as processor-executable instructions maintained by the memory 1106 and executed by the processor 1104 to implement various aspects and/or features of virtualizing isolation areas of solid-state storage media.

The accelerator 126, may be implemented independently or in combination with any suitable component or circuitry to implement aspects described herein. For example, accelerator 126 may be implemented as part of a DSP, processor/storage bridge, I/O bridge, graphics processing unit, memory controller, storage controller, arithmetic logic unit (ALU), or the like. The accelerator 126 may also be provided integrally with other entities of SoC 1100, such as integrated with the processor 1104, memory 1106, a host interface, a storage media interface, or firmware 1108 of the SoC 1100. Alternately or additionally, the accelerator 126, virtualizer 128, wear leveler 132, load balancer 134, and/or other components of the SoC 1100 may be implemented as hardware, firmware, fixed logic circuitry, or any combination thereof.

Figure 12:
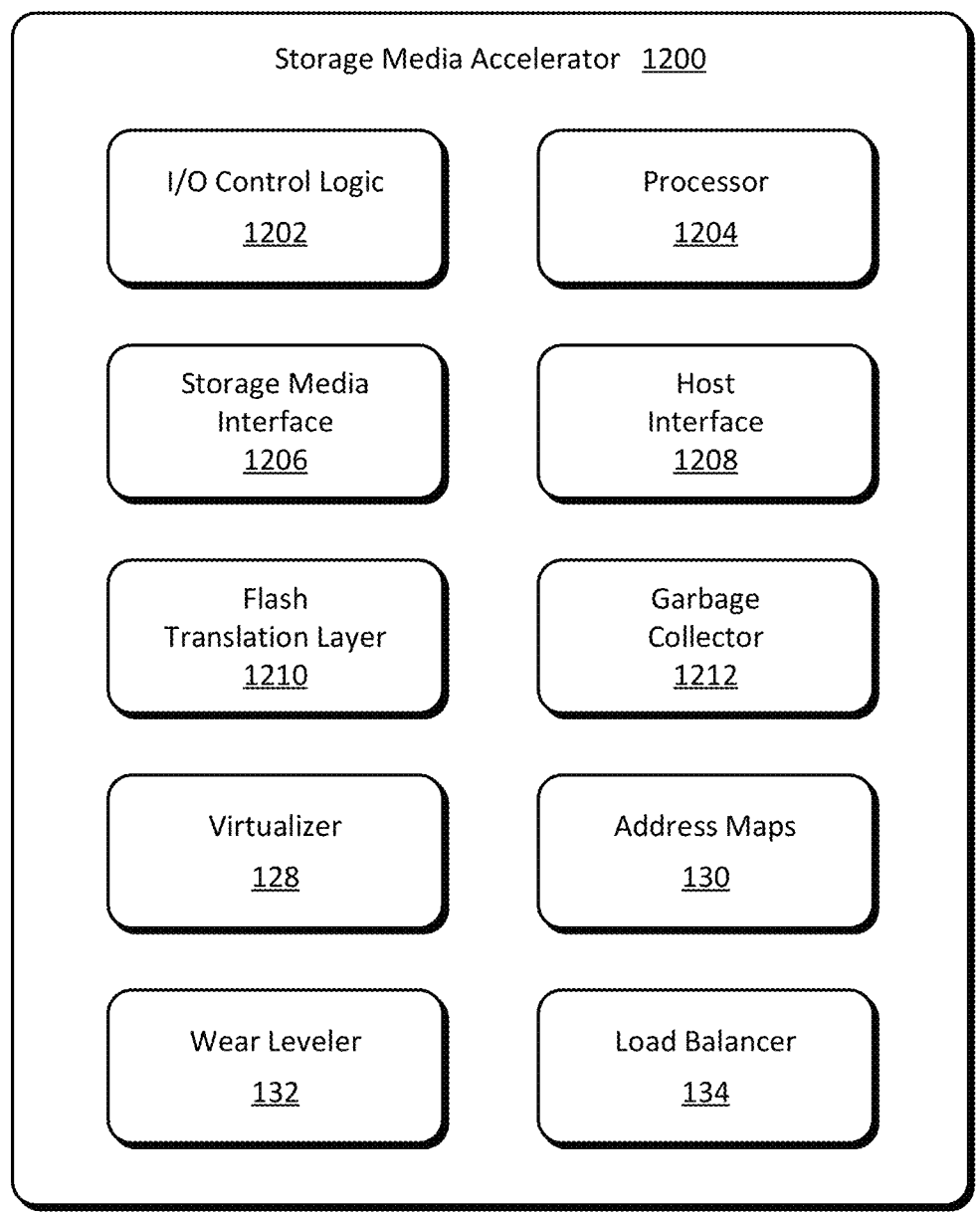
FIG. 12 illustrates an example storage media accelerator that is configured to implement aspects of virtualizing isolation areas of solid-state storage media.

As another example, consider FIG. 12 which illustrates an example storage media accelerator 1200 in accordance with one or more aspects of virtualizing isolation areas of solid-state storage media. In various aspects, the storage media accelerator 1200 or any combination of components thereof may be implemented as a storage drive controller, storage media controller, NAS controller, Fabric interface, NVMe initiator, NVMe target, or a storage aggregation controller for solid-state storage media. In some cases, the storage media accelerator 1200 is implemented similar to or with components of the SoC 1100 as described with reference to FIG. 11. In other words, an instance of the SoC 1100 may be configured as a storage media accelerator, such as the storage media accelerator 1200 to provide and manage virtualized isolation areas of solid-state media.

In this example, the storage media accelerator 1200 includes input-output (I/O) control logic 1202 and a processor 1204, such as a microprocessor, processor core, application processor, DSP, or the like. In some aspects, the processor 1204 and firmware of the storage media accelerator 1200 may be implemented to provide various functionalities associated with virtualizing isolation areas of solid-state storage media, such as those described with reference to methods 500, 600, 800, and/or 1000. The storage media accelerator also includes a storage media interface 1206 and a host interface 1208, which enable access to storage media and a host system, respectively. The storage media interface 1206 may include a physical page addressing (PPA) interface, peripheral component interconnect express (PCIe)

interface, non-volatile memory express (NVMe) interface, NVM over Fabric (NVM-OF) interface, NVM host controller interface specification (NVMHCIS) compliant interface, or the like. Alternately or additionally, the host interface may include a PCIe interface, SATA-based interface, NVMe interface, NVM-OF interface, NVMHCIS compliant interface, Fabric-enabled storage interface, or the like.

In this example, the storage media accelerator 1200 includes a flash translation layer 1210 (FTL 1210) and a garbage collector 1212. In some aspects of virtualizing isolation areas solid-state storage media, the storage media accelerator 1200 includes a host-side or non-drive-side FTL 1210 (e.g., pBLK layer for open-channel SSDs) and/or garbage collector 1212 for managing access of storage media of SSDs that are operably coupled with the accelerator. For example, the FTL 1210 may include a log manager for managing sequential write streams (e.g., write buffering), maintaining address maps of storage media, and implementing or coordinating garbage collection or media reuse with the garbage collector 1212. Alternately or additionally, the FTL 1210 may include a media management module for wear leveling, error correction coding, read-retry, bad-block management, metadata recovery, or the like. As such, these SSD functionalities may also be implemented by or offloaded to the storage media accelerator 1200.

The storage media accelerator 1200 also includes instances of a virtualizer 128, address maps 130, wear leveler 132, and load balancer 134. Any or all of these components may be implemented separately as shown or combined with the processor 1204, storage media interface 1206, host interface 1208, or flash translation layer 1210. Examples of these components and/or entities, or corresponding functionality, are described with reference to the respective components or entities of the environment 100 of FIG. 1 or respective configurations illustrated in FIG. 2, FIG. 3, and/or FIG. 4. The storage media accelerator 1200, either in whole or part, may be implemented as processor-executable instructions maintained by memory (not shown) of the accelerator and executed by the processor 1204 to implement various aspects and/or features of virtualizing isolation areas of solid-state storage media.

Although the subject matter has been described in language specific to structural features and/or methodological operations, it is to be understood that the subject matter defined in the appended claims is not necessarily limited to the specific examples, features, or operations described herein, including orders in which they are performed.

What is claimed is:

1. A method for virtualizing isolation areas of solid-state storage media, comprising:
    determining, via a storage media interface, a geometry of solid-state storage media of a solid-state storage drive that is coupled to the storage media interface;
    selecting, based on the geometry of the solid-state storage media of the solid-state storage drive, an area of the solid-state storage media as an isolated unit of storage within the solid-state storage drive, the area selected as the isolated unit of storage comprising a memory channel of the solid-state storage drive, a memory device of the solid-state storage drive, or a memory die of the solid-state storage drive;
    mapping a physical address of the isolated unit of storage to a virtual address through which the isolated unit of storage is accessible; and
    exposing, via the virtual address, the isolated unit of storage through a host interface to enable host access of the isolated unit of storage in the solid-state storage media.

2. The method as recited in claim 1, wherein the area selected is a first area of the solid-state storage media and the method further comprises:
    remapping the isolated unit of storage within the solid-state storage drive from the first area of the solid-state storage media to a second area of the solid-state storage media of the solid-state storage drive by altering, based on the geometry of the solid-state storage media, the physical address to which the virtual address of the isolated unit of storage is mapped from the physical address of the first area to a physical address of the second area of the solid-state storage media.

3. The method as recited in claim 1, wherein the solid-state storage drive is a first solid-state storage drive, the area of the solid-state storage media selected as the isolated unit of storage is a first area of the first solid-state storage drive, the physical address is a first physical address of the first area of the solid-state storage media, and the method further comprises:
    mapping, to the virtual address of the isolated unit of storage, a second physical address of a second area of the solid-state storage media of the first solid-state storage drive; or
    mapping, to the virtual address of the isolated unit of storage, a third physical address of a third area of other solid-state storage media of a second solid-state storage drive.

4. The method as recited in claim 3, wherein:
    the mapping of the second physical address of the second area of the storage media to the virtual address of the isolated unit of storage is implemented as part of a wear leveling function;
    the mapping of the third physical address of the third area of the other storage media to the virtual address of the isolated unit of storage is implemented as part of a wear leveling function; or
    the mapping of the third physical address of the third area of the other storage media to the virtual address of the isolated unit of storage is implemented as part of a load balancing function.

5. The method as recited in claim 1, wherein the geometry of the solid-state storage media of the solid-state drive comprises one of:
    a logical geometry of the solid-state storage media;
    a physical geometry of the solid-state storage media;
    a number of channels of the solid-state storage media;
    a number of logical units of the solid-state storage media;
    a number of parallel units of the solid-state storage media;
    a number of chunks of the solid-state storage media;
    a chunk size of the solid-state storage media; or
    a minimum write size of the solid-state storage media.

6. The method as recited in claim 1, further comprising:
    associating the isolated unit of storage with an initiator, a workload, a virtual machine, or a tenant of the host, and
    wherein the isolated unit of storage is isolated from another initiator, another workload, another virtual machine, or another tenant of the host.

7. The method as recited in claim 1, wherein:
    the storage media interface comprises one of a physical page addressing (PPA) interface, peripheral component interconnect express (PCIe) interface, non-volatile memory express (NVMe) interface, NVM over Fabric (NVM-OF) interface, or NVM host controller interface specification (NVMHCIS) compliant interface; and the host interface comprises one of a PCIe interface, NVMe interface, NVM-OF interface, or NVMHCIS compliant interface.

8. The method as recited in claim 1, wherein:
the isolated unit of storage is a first isolated unit of storage within the solid-state storage drive; and
the solid-state storage drive comprises at least a second isolated unit of storage that is isolated from the first isolated unit of storage.

9. The method as recited in claim 8, further comprising:
associating the first isolated unit of storage within the solid-state storage drive with a first initiator, a first workload, a first virtual machine, or a first tenant of the host; and
associating the second isolated unit of storage within the solid-state storage drive with a second initiator, a second workload, a second virtual machine, or a second tenant of the host.

10. An apparatus comprising:
a hardware-based processor;
a memory coupled to the processor and configured to maintain processor-executable instructions that, responsive to execution, implement an application on the apparatus;
a host interface configured to enable the application to access data in storage media associated with the apparatus;
a storage media accelerator coupled to the host interface and providing a storage media interface, the storage media accelerator configured to:
determine, through the storage media interface, a geometry of solid-state storage media of a solid-state storage drive that is operably coupled with the apparatus;
select, based on the geometry of the solid-state storage media of the solid-state storage drive, an area the of the solid-state storage media as an isolated unit of storage within the solid-state storage drive, the area selected as the isolated unit of storage comprising a memory channel of the solid-state storage drive or a memory die of the solid-state storage drive;
map a physical address of the isolated unit of storage to a virtual address through which the isolated unit of storage is accessible; and
expose, via the virtual address, the isolated unit of storage within the solid-state storage drive through the host interface to enable access of the isolated unit of storage by the application.

11. The apparatus as recited in claim 10, wherein the area selected is a first area of the solid-state storage media and the storage media accelerator is further implemented to:
remap the isolated unit of storage within the solid-state storage drive from the first area of the solid-state storage media to a second area of the solid-state storage media of the solid-state storage drive by altering, based on the geometry of the solid-state storage media, the physical address to which the virtual address of the isolated unit of storage is mapped from the physical address of the first area to the physical address of the second area of the solid-state storage media.

12. The apparatus as recited in claim 10, wherein the solid-state storage drive is a first solid-state media drive, the area of the solid-state storage media selected as the isolated unit of storage is a first area of the first solid-state storage drive, the physical address is a first physical address of the first area of the solid-state storage media, and the storage media accelerator is further implemented to:
map, to the virtual address of the isolated unit of storage, a second physical address of a second area of the solid-state storage media of the first solid-state storage drive; or
map, to the virtual address of the isolated unit of storage, a third physical address of a third area of other solid-state storage media of a second solid-state storage drive.

13. The apparatus as recited in claim 10, wherein the geometry of the solid-state storage media comprises one of:
a logical geometry of the solid-state storage media;
a physical geometry of the solid-state storage media;
a number of channels of the solid-state storage media;
a number of logical units of the solid-state storage media;
a number of parallel units of the solid-state storage media;
a number of chunks of the solid-state storage media;
a chunk size of the solid-state storage media; or
a minimum write size of the solid-state storage media.

14. The apparatus as recited in claim 10, wherein:
the apparatus further comprises the solid-state storage drive operably coupled to the storage media interface of the storage media accelerator; or
the solid-state storage drive is configured as nearline or direct attached storage of the apparatus.

15. The apparatus as recited in claim 10, wherein:
the application is a first application associated with the isolated unit of storage;
responsive to execution, the processor-executable instructions further implement a second application on the apparatus; and
the isolated unit of storage within the solid-state storage drive is isolated from access of the solid-state storage drive by the second application on the apparatus.

16. A System-on-Chip (SoC) comprising:
a storage media interface;
a host interface through which access to storage media is provided to a host;
a hardware-based processor;
a memory configured to store an address map and processor-executable instructions that, responsive to execution by the hardware-based processor, implement a storage media accelerator to:
determine a geometry of solid-state storage media of a solid-state storage drive that is operably coupled with the storage media interface, the geometry exposed by the solid-state storage media through the storage media interface;
select, based on the geometry of the solid-state storage media of the solid-state storage drive, an area of the solid-state storage media as an isolated unit of storage within the solid-state storage drive, the area selected as the isolated unit of storage comprising a memory channel of the solid-state storage drive, a memory device of the solid-state storage drive, or a memory die of the solid-state storage drive;
associate, in the address map, a physical address of the isolated unit of storage with a virtual address through which the isolated unit of storage is accessible; and
expose, via the virtual address, the isolated unit of storage within the solid-state storage media drive through the host interface to enable access of the isolated unit of storage by the host.

17. The SoC as recited in claim 16, wherein the area selected is a first area of the solid-state storage media, the physical address is a first physical address of the first area, and the storage media accelerator is further implemented to:
    associate, in the address map and based on the geometry of the solid-state storage media, a second physical address of a second area of the solid-state storage media to the virtual address of the isolated unit of storage effective to remap the isolated unit of storage from the first area to the second area of the solid-state storage media within the solid-state storage drive.

18. The SoC as recited in claim 17, wherein the storage media accelerator is further implemented to remap the isolated unit of storage from the first area of the solid-state storage media to the second area of the solid-state storage media as part of a wear leveling operation or a load balancing operation for the solid-state storage media.

19. The SoC as recited in claim 16, wherein the solid-state storage drive is configured to expose the geometry as one of:
    a logical geometry of the solid-state storage drive;
    a physical geometry of the solid-state storage drive;
    a number of channels of the solid-state storage drive;
    a number of logical units of the solid-state storage drive;
    a number of parallel units of the solid-state storage drive;
    a number of chunks of the solid-state storage drive;
    chunk size of the solid-state storage drive; or
    a minimum write size of the solid-state storage drive.

20. The SoC as recited in claim 16, wherein the SoC is embodied on or implemented as part of a host device, a server, a server blade, a storage blade, a storage backplane, a storage media expansion device, a storage media card, a storage media adapter, network attached storage, a Fabric-enabled storage target, or an NVMe-based storage controller.

\* \* \* \* \*